United States Patent
Roh et al.

(10) Patent No.: US 8,331,871 B2
(45) Date of Patent: Dec. 11, 2012

(54) METHOD FOR GENERATING AND TRANSMITTING CHANNEL QUALITY INDICATOR BASED ON ADJACENT BAND SELECTION SCHEME

(75) Inventors: Dong Wook Roh, Gyeonggi-do (KR); Bong Hoe Kim, Gyeonggi-do (KR); Joon Kui Ahn, Gyeonggi-do (KR); Yu Jin Noh, Gyeonggi-do (KR); Dong Youn Seo, Gyeonggi-do (KR); Ki Jun Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 512 days.

(21) Appl. No.: 12/675,768

(22) PCT Filed: Aug. 14, 2008

(86) PCT No.: PCT/KR2008/004745
§ 371 (c)(1),
(2), (4) Date: Feb. 26, 2010

(87) PCT Pub. No.: WO2009/028819
PCT Pub. Date: Mar. 5, 2009

(65) Prior Publication Data
US 2010/0233968 A1    Sep. 16, 2010

(30) Foreign Application Priority Data

Aug. 31, 2007  (KR) .................. 10-2007-0088194

(51) Int. Cl.
*H04B 17/00* (2006.01)

(52) U.S. Cl. .................. 455/67.13; 455/452.2; 455/69; 455/154.1; 455/104; 370/329; 370/332

(58) Field of Classification Search ............ 455/69, 455/67.13, 104, 114.2, 115.1, 115.4, 135, 455/150.1, 154.1, 158.1, 161.3, 188.1; 370/332, 370/333, 329, 328, 330, 342; 375/267
See application file for complete search history.

(56) References Cited

U.S. PATENT DOCUMENTS

| | | | |
|---|---|---|---|
| 7,535,869 B2* | 5/2009 | Yoon et al. | 370/329 |
| 8,259,658 B2* | 9/2012 | Nishio et al. | 370/329 |
| 2004/0114507 A1* | 6/2004 | Yoo et al. | 370/208 |
| 2005/0068884 A1* | 3/2005 | Yoon et al. | 370/203 |
| 2007/0191065 A1* | 8/2007 | Lee et al. | 455/562.1 |
| 2009/0147866 A1* | 6/2009 | She et al. | 375/260 |
| 2009/0262653 A1* | 10/2009 | Toda et al. | 370/252 |

FOREIGN PATENT DOCUMENTS

EP      1533966      5/2005
KR   1020070067705   6/2007

* cited by examiner

*Primary Examiner* — Tan Trinh
(74) *Attorney, Agent, or Firm* — Lee, Hong, Degerman, Kang & Waimey

(57) ABSTRACT

A method of generating and transmitting a channel quality indicator is disclosed, by which a feedback size of channel quality information is reduced. The present invention includes selecting at least one subband by considering a channel quality of each of entire subbands formed by grouping a predetermined number of subcarriers, additionally selecting subbands adjacent to the at least one subband selected in the first selection step, and generating the channel quality indicator corresponding to the subbands selected in the first selection step and the second selection step.

14 Claims, 5 Drawing Sheets

METHOD FOR GENERATING AND TRANSMITTING CHANNEL QUALITY INDICATOR BASED ON ADJACENT BAND SELECTION SCHEME

CROSS-REFERENCE TO RELATED APPLICATIONS

This application is the National Stage filing under 35 U.S.C. 371 of International Application No. PCT/KR2008/004745, filed on Aug. 14, 2008, which claims the benefit of earlier filing date and right of priority to Korean Application No. 10-2007-0088194, filed on Aug. 31, 2007.

TECHNICAL FIELD

The present invention relates to a method of generating a channel quality indicator in a mobile communication system, and more particularly, to a method of generating and transmitting a channel quality indicator based on an adjacent band selection scheme. Although the present invention is suitable for a wide scope of applications, it is particularly suitable for reducing an overhead generated from channel quality indicator transmission in a mobile communication system.

BACKGROUND ART

Generally, it is efficient that channel information is fed back for efficient communication. For this, downlink channel information is sent in uplink and uplink channel information is sent in downlink. This channel information is called a channel quality indicator (hereinafter abbreviated CQI). The CQI can be generated in various ways. For instance, the CQI can be generated by one of a method of quantizing and uploading a channel status, a method of calculating and uploading SINR, a method of indicating a state for applying a channel actually like MCS (Modulation and Coding Set) scheme and the like.

In the various CQI generating methods, it is in general that the CQI is actually generated based on MCS. This is explained in detail as follows. First of all, there is CQI generation for transmission scheme such as HSDPA in 3GPP system and the like. Thus, in case that CQI is generated based on MCS, the MCS particularly include a modulation scheme, a coding scheme and a corresponding coding rate. As the modulation and coding schemes are changed, the CQI has to be correspondingly changed. Hence, at least one CQI is necessary per codeword.

If MIMO is applied to a system, the number of necessary CQIs may be increased. In particular, since MIMO system generates multi-channels using a multi-antenna, several codewords are usable at the same time. Hence, several CQIs should be used correspondingly. Thus, in case that a plurality of CQIs are used, a size of corresponding control information increases in proportion.

Figure 1:
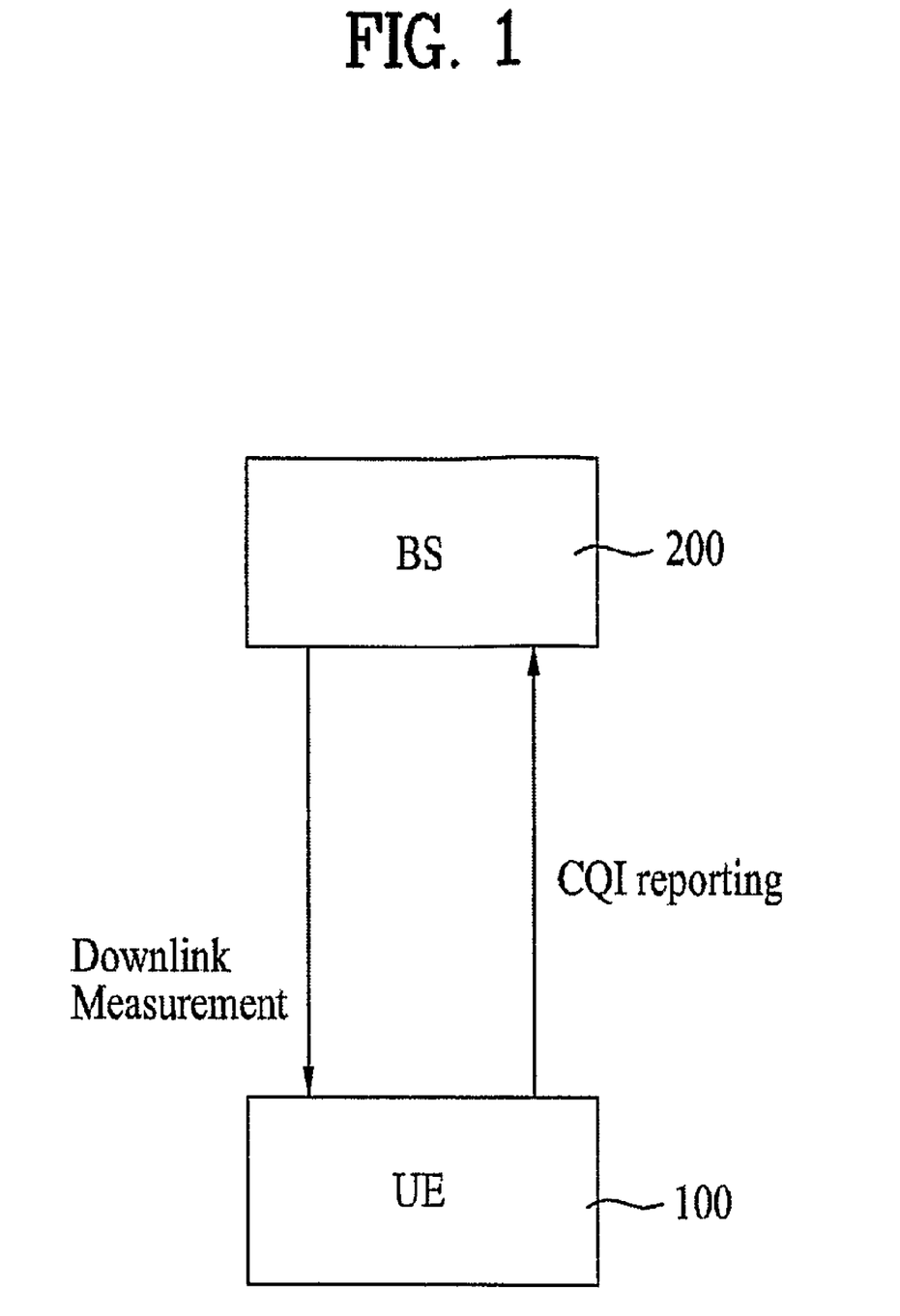
FIG. 1 is a conceptional diagram for generation and transmission of CQI.

FIG. 1 is a conceptional diagram for generation and transmission of CQI.

Referring to FIG. 1, a terminal or UE (User Equipment) 100 measures a downlink quality and then reports a CQI value selected on the basis of the measured downlink quality to a base station (BS) via uplink control channel. The base station 200 performs downlink scheduling (e.g., terminal selection, resource allocation, etc.) according to the reported CQI. In this case, the CQI value may include one of SINR (signal to interference and noise ratio) of channel, CINR (carrier to interference and noise ratio), BER (bit error rate), FER (frame error rate) and the like. And, the CQI value may include a value resulting from converting one of them to transmittable data. In case of MIMO system, information reflecting a channel status such as RI (rank information), PMI (precoding matrix information) and the like can be added to the CQI value.

In a mobile communication system, link adaptation is adopted to maximumly use channel capacity given to a channel. The link adaptation provides a method of controlling MCS (modulation and coding set) and transmission power according to a given channel. In order for a base station to perform the link adaptation, a user has to feed back channel quality information to the base station.

If a frequency band used by a system exceeds a coherence bandwidth, a channel is abruptly changed within a system bandwidth. Specifically, in a multi-carrier system such as orthogonal frequency division multiplexing (hereinafter abbreviated OFDM) system, a plurality of subcarriers exist within a given bandwidth. As modulated symbols are carried by each of the subcarriers, optimal channel transmission means that channel information of each subcarrier is transmitted. Hence, a feedback size of channel information in a multi-carrier system having a plurality of subcarriers is abruptly increased.

Moreover, in case that channel information on a specific frequency band is selectively transmitted to reduce the above-mentioned increase of the feedback size of the channel information, information on a position of a selected frequency band should be transmitted in addition.

DISCLOSURE OF THE INVENTION

Technical Problem

Accordingly, the present invention is directed to a method of generating and transmitting a channel quality indicator based on an adjacent band selection scheme that substantially obviates one or more of the problems due to limitations and disadvantages of the related art.

An object of the present invention is to provide a method of generating and transmitting a channel quality indicator, by which a feedback size of channel quality information and a size of position information of a frequency band corresponding to the channel quality information can be reduced in a mobile communication system.

Another object of the present invention is to provide an adjacent band selection scheme for minimizing a transmission of position information of a frequency band corresponding to channel quality information in fed-back information and a method of generating and transmitting a channel quality indicator using the scheme.

A further object of the present invention is to provide a peak-M scheme, by which the adjacent band selection scheme can be more efficiently applied.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

Technical Solution

To achieve these and other advantages and in accordance with the purpose of the present invention, as embodied and broadly described, a method of generating a channel quality indicator (CQI), which is generated by a user equipment, includes a first selection step of selecting at least one subband by considering a channel quality of each of entire subbands formed by grouping a predetermined number of subcarriers, a second selection step of additionally selecting subbands adjacent to the at least one subband selected in the first selection step, and a step of generating the channel quality indicator corresponding to the subbands selected in the first selection step and the second selection step.

Preferably, the number of the subbands additionally selected in the second selection step is determined to be proportional to at least one selected from the group consisting of a whole system bandwidth and a frequency bandwidth allocated to the user equipment.

More preferably, the subbands additionally selected in the second selection step are sequentially selected in order of being adjacent to both sides of two subbands most adjacent to both sides of the subband selected in the first selection step.

Preferably, the subbands additionally selected in the second selection step are selected from the subbands not overlapped with the subband selected in the first selection step.

Preferably, in the channel quality indicator generating step, the channel quality indicator corresponding to the subbands additionally selected in the second selection step is generated as a difference value from the channel quality indicator corresponding to the subbands selected in the first selection step.

In this embodiment, the first selection step needs not to be limited to a specific scheme. Yet, the first selection step includes the step of selecting at least one from the subbands corresponding to a point indicating a peak in a whole channel quality profile. This is more efficient because overlapping can be prevented from being generated in selecting the adjacent bands in the second selection step. Thus, a scheme of selecting a peak will be named a Peak-M scheme for selecting M peaks randomly and will be explained in detail later.

More preferably, the point indicating the peak indicates a point at which a channel quality is changed into a decrease from an increase in the whole channel profile.

In this case, the peak is the one having the channel quality equal to or greater than a prescribed threshold among entire peaks in the whole channel quality profile.

To further achieve these and other advantages and in accordance with the purpose of the present invention, a method of generating a channel quality indicator (CQI), which is generated by a user equipment, includes a first selection step of selecting at least one subband by considering a channel quality of each of entire subbands formed by grouping a predetermined number of subcarriers, a second selection step of additionally selecting subbands adjacent to the at least one subband selected in the first selection step, a third selection step of additionally selecting a single subband by considering channel qualities of subbands except the subbands selected in the preceding selection steps including the first and second selection steps, a fourth selection step of additionally selecting subbands adjacent to the subband selected in the third step from the subbands except the subbands selected in the preceding selection steps including the first and second selection steps, and a step of generating the channel quality indicator corresponding to the subbands selected through the first to fourth selection steps.

Preferably, the third and fourth selection steps are repeatedly performed.

To further achieve these and other advantages and in accordance with the purpose of the present invention, a method of transmitting a channel quality indicator (CQI), which is transmitted by a user equipment, includes a first selection step of selecting at least one first subband by considering a channel quality of each of entire subbands formed by grouping a predetermined number of subcarriers, a second selection step of additionally selecting second subbands adjacent to the at least one first subband, a step of generating the channel quality indicator corresponding to the first and second subbands, and a step of transmitting the generated channel quality indicator and position information of the subband for generating the channel quality indicator.

Preferably, in the transmitting step, position information of the second subbands is not transmitted.

Preferably, in the transmitting step, transmission of the channel quality indicators corresponding to the second subbands is performed in a manner of transmitting channel quality information corresponding to one of the two second subbands symmetric centering on the first subband.

Preferably, in the transmitting step, transmission of the channel quality indicators corresponding to the second subbands is performed in a manner of transmitting an average of channel quality informations corresponding to the two second subbands symmetric centering on the first subband.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, a feedback size of channel quality information and a size of position information of a frequency band corresponding to the channel quality information can be reduced in a mobile communication system.

In particular, according to one embodiment of the present invention, after a specific CQI subband has been selected, a CQI is generated and then transmitted by selecting a subband adjacent to the selected specific CQI subband. Therefore, a receiving side is enabled to obtain channel information of more bands without transmitting band position information of the additionally selected subband.

Secondly, according to one preferred embodiment of the present invention, Peak-M scheme is used to select a subband preferentially prior to performing an adjacent band selection. Therefore, it is able to prevent an overlapped subband from being selected in case of the adjacent band selection.

Thirdly, instead of selecting a specific subband preferentially and then selecting an adjacent subband, both of the specific band selection and the adjacent band selection are incorporatively and simultaneously performed. Therefore, it is able to select a CQI subband more efficiently without redundancy.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Reference will now be made in detail to the preferred embodiments of the present invention, examples of which are illustrated in the accompanying drawings.

First of all, the following detailed description disclosed together with the accompanying drawings is intended not to indicate a unique embodiment of the present invention but to represent an exemplary embodiment of the present invention. For instance, the following description takes a detailed example applied to the 3GPP LTE system to help the understanding. Yet, the present invention is applicable to every communication system, for which feedback of downlink quality information is required, as well as the 3GPP LTE system.

The following detailed description includes details to provide the full understanding of the present invention. And, it is apparent to those skilled in the art that the present invention can be implemented without the details. In some cases, the structures and devices known to public are omitted to avoid the conceptional vagueness of the present invention or are depicted as block diagrams centering on core functions of the structures and devices. Wherever possible, the same reference numbers will be used throughout the drawings to refer to the same or like parts.

As mentioned in the foregoing description, according to one embodiment of the present invention, a method of generating and transmitting a channel quality indicator in a mobile communication system by reducing a feedback size of channel quality information and a size of position information of a frequency band corresponding to the channel quality information. For this, explained in the following description are the methods considerable to reduce an overhead in CQI generation and transmission.

As a first method, a method of changing a unit of channel information transmission is possible. For instance, in OFDM system, several subcarriers are put together into a single subcarrier group and channel information carried by each subcarrier is then transmitted by the corresponding group unit. In particular, in OFDM system using 2,048 subcarriers, if every twelve subcarriers are put together to construct a single subcarrier group, total 171 subcarrier groups are formed. Therefore, a size of actually transmitted channel information is reduced to 171 from 2,048.

In the following description for the present embodiment, in case that a frequency band is discriminated into the respective subcarriers like the OFDM system, at least one or more subcarriers are put together into a single group and each CQI is then reported by dividing the at least one or more subcarriers by the subcarrier group unit. A basic unit of this method is defined as 'CQI subcarrier group' or 'CQI subband'.

Meanwhile, in case that a frequency band is not discriminated into subcarriers, a whole frequency band is divided into some frequency bands. CQI is generated with reference to the divided frequency band. And, the frequency band divided for the CQI generation is defined as 'CQI subband' as well.

Moreover, such a CQI subband can be named 'subband' in a simple manner.

As a second method, a method of generating CQI by compressing channel information is possible. For instance, In OFDM system, channel information of each subcarrier is transmitted by being compressed using a specific compression scheme. In this case, the compression scheme can include DCT (discrete cosine transform) or the like.

As a third method, a method of generating a CQI by selecting a corresponding frequency band to generate channel information is possible. For instance, in OFDM system, instead of transmitting channel information via every subcarrier, Best-M scheme for transmitting channel information by selecting best M subcarriers from subcarriers or a subcarrier group is possible.

When CQI is transmitted by selecting such a frequency band, an actually transmitted part can be mainly divided into two parts. A first part is a CQI value part and a second part is a CQI index part.

Figure 2:
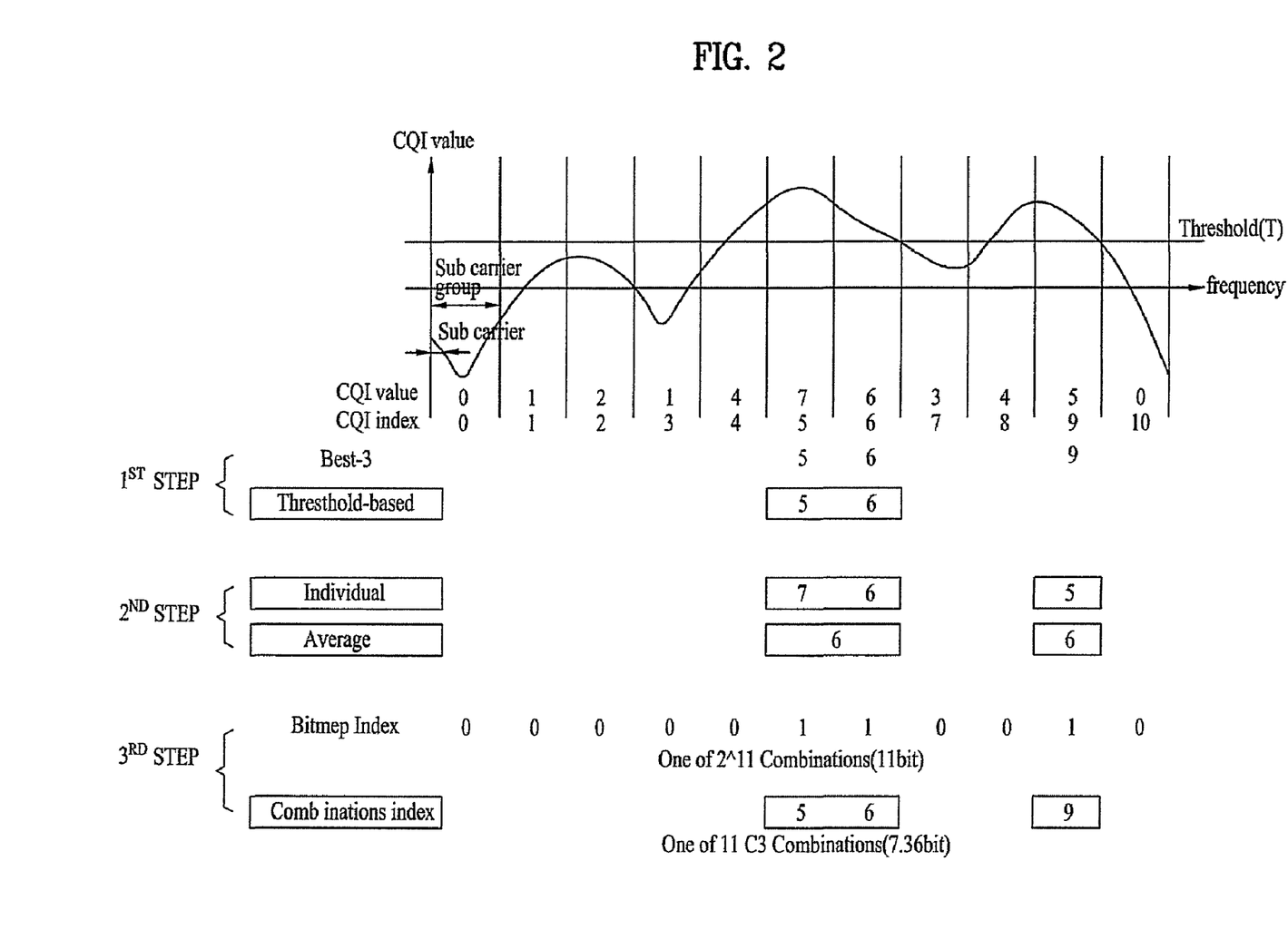
FIG. 2 is a diagram for a method of generating a CQI by selectively setting a CQI subband in a frequency domain.

FIG. 2 is a diagram for a method of generating a CQI by selectively setting a CQI subband in a frequency domain.

Referring to FIG. 2, in a graph shown on a top, a horizontal axis indicates a frequency axis and a vertical axis indicates a CQI value in each frequency domain. Moreover, in the top graph shown in FIG. 2, the horizontal axis is divided by a subband unit in which a plurality of subcarriers are grouped together. And, an index is allocated to each subband.

Frequency band selective CQI scheme mainly includes three parts. A first part is a step of selecting a frequency band, i.e., a CQI subband to generate a CQI. A second part is a step of generating and transmitting CQI values of the selected frequency bands by manipulation thereof. And, a third part is a step of transmitting the selected frequency band, i.e., an index of the corresponding CQI subband.

FIG. 2 exemplarily shows Best-M scheme and Threshold-based scheme as a method of selecting CQI subband in the first step.

The Best-M scheme is a method of selecting M CQI subbands in good channel status. In the example shown in FIG. 2, CQI subbands of indexes 5, 6 and 9 in good channel status are selected using Best-3 scheme. Moreover, the threshold-based scheme is a scheme for selecting a CQI subband having a channel status higher than a predetermined threshold. In the example shown in FIG. 2, CQI subbands of indexes 5 and 6, which are higher than a threshold T, are selected.

In FIG. 2, as examples for a method of generating and transmitting CQI values in the second step, an individual transmission scheme and an average transmission scheme are shown.

The individual transmission scheme is a method of transmitting all CQI values of the CQI subband selected in the first step. Hence, the individual transmission scheme have more CQI values to transmit if the number of the selected CQI subbands is incremented.

The average transmission scheme is a method of transmitting an average of the CQI values of the selected CQI subband. Hence, the average transmission scheme is advantageous in that a CQI value to be transmitted becomes one regardless of the number of the selected CQI subbands but is disadvantageous in that accuracy is degraded due to the transmission of the average of several CQI subbands. In this case, the average is calculated by a simple arithmetic average scheme or an average scheme with consideration of channel capacity.

In FIG. 2, depicted is an example that the CQI generating and transmitting method in the second step selects the CQI subbands 5, 6 and 9 according to the Best-3 scheme in the first step. In particular, according to the individual transmission scheme in the second step, CQI values 7, 6 and 5 of the subbands 5, 6 and 9 are individually generated and transmitted. According to the average transmission scheme, '6' resulting from arithmetically averaging CQI values of the subbands 5, 6 and 9 is generated and transmitted.

In FIG. 2, as examples for a method of transmitting an index of a CQI subband in the third step, a bitmap index scheme and a general combinatorial index scheme are shown.

In the bitmap index scheme, a bit is allocated to each CQI subband. If a corresponding CQI subband is used, '1' is allocated. If a corresponding CQI subband is not used, '0' is allocated. Thus, the bitmap index scheme is the scheme for indicating which CQI subband is used. The bitmap index scheme is disadvantageous in that a bit number is necessary as many as a total CQI subband number but is advantageous in that a constant number of bits are always used no matter how many CQI subbands are used.

In the combinatorial index scheme, it is determined how many CQI subbands will be used. Cases of combinations amounting to the number of used CQI subbands among total CQI subbands are mapped to indexes, respectively. In particular, assuming that total N CQI subbands exist, if M of the N CQI subbands are used for CQI generation, a total number of possible combinations is expressed as follows.

$$_N C_M = \frac{N!}{M!(N-M)!} \quad [\text{Formula 1}]$$

The bit number to indicate the number of cases of Formula 1 can be determined by Formula 2.

$$\lceil \log_2(_N C_M) \rceil = \left\lceil \log_2\left(\frac{N!}{M!(N-M)!}\right) \right\rceil \quad [\text{Formula 2}]$$

In the example shown in FIG. 2, three CQI subbands are selected from total eleven CQI subbands. Hence, the number of possible cases corresponds to $_{11}C_3=165$. And, the bit number to indicate '165' corresponds to 8 bits ($2^7 \leq {}_{11}C_3 \leq 2^8$).

Meanwhile, as mentioned in the foregoing description, after a specific subband has been selected, instead of transmitting all position information of the selected subband by the bitmap scheme or the combinatorial index scheme, if a position of the specific subband is transmittable only, it will be able to reduce the overhead according to the position information transmission of the CQI subband more efficiently.

Therefore, in order to reduce system performance degradation despite that position information of a specific subband of CQI subband is transmitted, a CQI subband satisfying a specific condition is preferentially selected in case of CQI subband selection. A subband adjacent to the selected subband is then additionally selected and used for CQI generation and transmission. This is called an adjacent band selection scheme. Thus, a CQI generating and transmitting method based on the adjacent band selection scheme according to one preferred embodiment of the present invention is proposed.

In particular, in the CQI subband selection for CQI generation, it is able to consider a method of transmitting not only a CQI subband selected by one of general methods but also CQIs of adjacent CQI subbands corresponding to additionally selected subbands right and left next to the former CQI subband. If the considered method is applied, it is advantageous in that CQIs of several steps can be basically transmitted without additional transmission of CQI index. If so, an index of a firstly selected CQI subband is transmitted only. Such a CQI generating and transmitting method according to one preferred embodiment of the present invention is explained in detail with reference to the accompanying drawings as follows.

Figure 3:
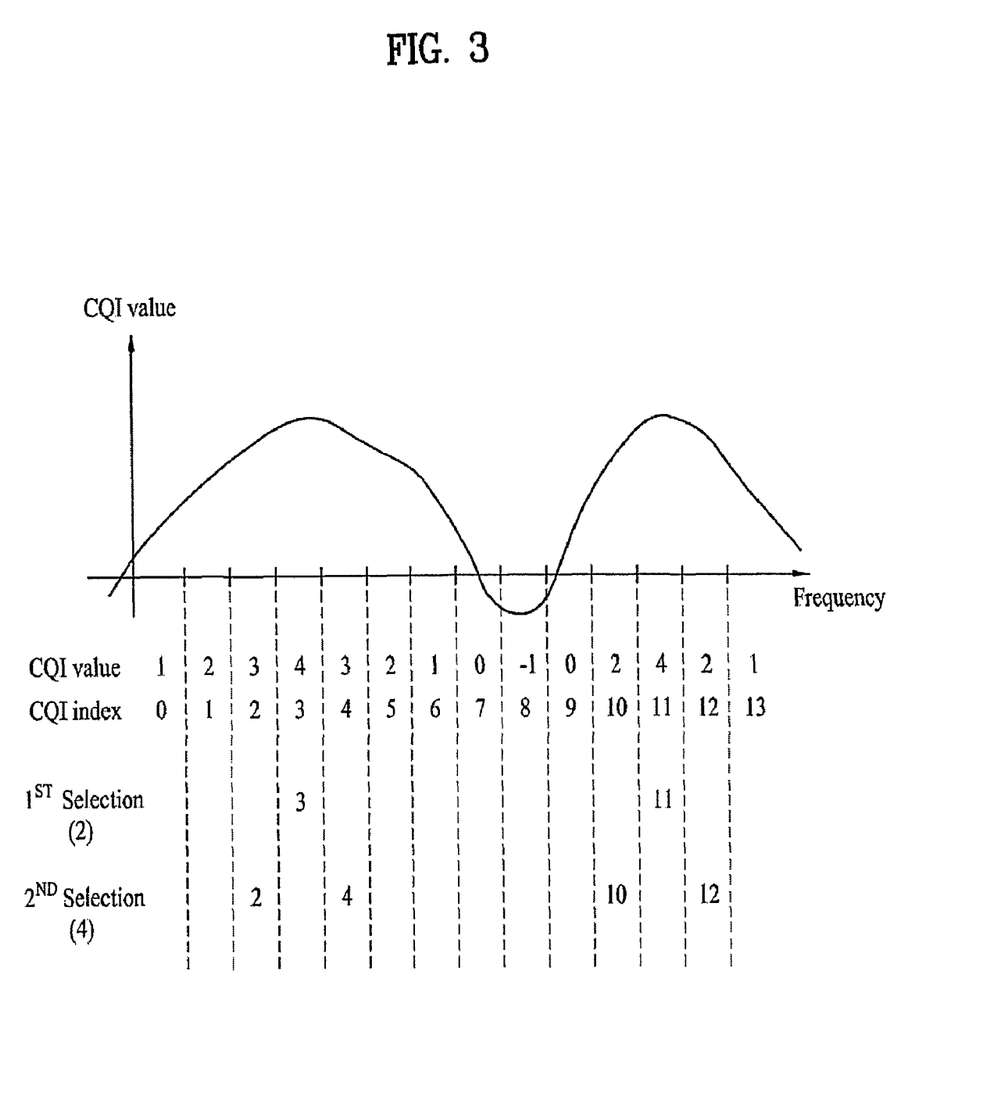
FIG. 3 is a diagram for a CQI generating and transmitting method based on an adjacent band selection scheme according to one preferred embodiment of the present invention.

FIG. 3 is a diagram for a CQI generating and transmitting method based on an adjacent band selection scheme according to one preferred embodiment of the present invention.

Referring to FIG. 3, like FIG. 2, in a graph shown on a top, a horizontal axis indicates a frequency axis and a vertical axis indicates a CQI value in each frequency domain. Moreover, in the top graph shown in FIG. 3, the horizontal axis is divided by a subband unit in which a plurality of subcarriers are grouped together. And, an index is allocated to each subband.

According to the present embodiment, first of all, in a step of a first selection, at least one subband is selected by considering each channel quality of entire subbands. In FIG. 3, shown is a case that a subband is primarily selected according to the Best-M scheme of setting M to 2. Hence, subbands 3 and 11 are selected in FIG. 3. Yet, the scheme for selecting the subband in the first selection step can adopt any random scheme as well as the Best-M scheme. In case of using Peak-M scheme explained in the following description, it will be more effective. This will be explained later.

According to the present embodiment, in a step of second selection, subbands adjacent to the former subbands (e.g., subbands 3 and 11) selected in the first selection step are additionally selected. FIG. 3 shows an example that subbands 2, 4, 10 and 12 adjacent to the subbands 3 and 11 selected in the first selection step are selected.

Although FIG. 3 shows the example of selecting subbands most adjacent to both sides of the subband selected in the first selection step in addition, the number of adjacent CQI subbands additionally selected in the present embodiment can be diversely set. The number of the additionally selected subbands is determined by an upper layer (e.g., upper layer over second layer) and is then transmitted to a user. Alternatively, the number of the additionally selected subbands can be determined by a user.

One preferred embodiment of the present invention proposes the number of the additionally selected subbands to be set proportional to at least one of a whole system band width and a frequency bandwidth allocated to a user equipment. Namely, the number of additionally selected CQI subbands preferably increases/decrease if a whole system bandwidth increases/decreases. The number of the additionally selected subbands preferably increases/decreases if a downlink frequency band allocated to a user increases/decreases.

As mentioned in the foregoing description, in case that a plurality of adjacent subbands are set to be additionally selected, it is preferable that subbands additionally selected in the second selection step are sequentially selected in order of being adjacent to both sides of the subbands selected in the first selection step from the two subbands most adjacent to the subbands selected in the first selection step. Namely, iterative selection can be performed in a manner of generating CQI by primarily selecting a CQI subband and then generating CQI by secondarily selecting subbands most adjacent to the primarily selected subbands. Thereafter, if a subband is additionally selected, subbands most adjacent to the secondarily selected subbands are additionally selected. For instance, in the example shown in FIG. 3, subbands 3 and 11 are selected in the first selection step and subbands 2, 4, 10 and 12 are then selected in the second selection step. In case of attempting to select subbands additionally, subbands 1, 5, 9 and 13 adjacent to the subbands 2, 4, 10 and 12 can be additionally selected. Namely, the second selection step can be iteratively performed.

Meanwhile, in case that adjacent band CQI subband is not going to be extended any further, it is able to consider a method of collecting CQIs of CQI subband not indicated by a CQI value so far and then transmitting an average of the CQIs separately, which non-limits various implementations examples of the present embodiment.

Like the present embodiment, in case that a selection of a subband for CQI generation is performed based on an adjacent band selection scheme, it is not necessary to transmit position information of a subband additionally selected in the second selection step. Hence, it is able to reduce an overhead in CQI position information transmission. In particular, a transmission of index information of CQI subband is performed by transmitting information on subbands 3 and 11 only. A receiving side having received the information on the subband 3 and 11 is able to know that the received CQI values are CQI values of the subbands 3 and 11 and CQI values of subbands 2, 4, 10 and 12 adjacent to the subbands 3 and 11.

According to the present embodiment, in transmitting the CQI values of the adjacent subbands, all the respective CQI values can be transmitted. Alternatively, a single CQI value can be transmitted only by taking an average of all the selected CQIs. Assuming that CQI values of adjacent CQI subbands, which are selected in the second selection step, on both sides are symmetrically identical to each other, one of the CQI values of the adjacent CQI subbands on both sides is transmitted or an average of the CQI values can be sent.

According to the present embodiment, in transmitting a CQI value of the adjacent subband selected in the second selection step, CQI values of adjacent subbands are represented as difference values from the CQI value of the subband selected in the first selection step and are then transmitted. In particular, it is highly probable that the CQI value of the adjacent subband selected in the second selection step is smaller than that of the subband selected in the first selection step. Therefore, when the CQI of the adjacent subband selected in the second selection step is represented, a difference value (differential scheme) different from the CQI value of the subband selected in the first selection step is used to effectively represent the CQI using a less size of bits. Preferably, assuming that all the difference values represent negative values, it is able to transmit absolute values of the difference values only. For instance, in the present embodiment, instead of transmitting the CQI values 2, 4, 10 and 12 of the subbands 2, 4, 10 and 12 selected in the second selection step shown in FIG. 3, the CQI values of the subbands are represented as the difference values from the CQI values of the subbands 3 and 11 selected in the first selection step, and preferably, the absolute values of the difference values. Hence, it is able to represent the CQI values of the subbands 2, 4, 10 and 12 as the difference values 1 and 2.

In the present embodiment, in transmitting the CQI values of the adjacent subbands, instead of transmitting several CQI values corresponding to the respective subbands, it is able to transmit a slope of the CQI value. In particular, it is able to consider transmitting a slope value indicating a difference between the CQI value of the CQI subband selected in the first selection step and the CQI value of the adjacent subband selected in the second selection step.

As mentioned in the foregoing description, the CQI value of the adjacent subband selected in the second selection step generally becomes smaller than the CQI value of the subband selected in the first selection step. Hence, the CQI value of the left adjacent subband of the subband selected in the first selection step has a positive slope, while the CQI value of the right adjacent subband of the subband selected in the first selection step has a negative slope. Namely, in the present embodiment, it is able to transmit the absolute values of the slopes to replace the CQI values, respectively.

Meanwhile, in case that a plurality of adjacent CQI subbands exist, the above slopes can exist plurally. And, it is able to consider a method of selecting a slope conservatively to indicate a minimum CQI. Alternatively, it is able to transmit an average of several slopes as well.

The CQI generating method based on the above-mentioned adjacent band selection scheme is the method of selecting a subband primarily in the first selection step, which is able to use the following Peak-M scheme as well as the above-mentioned Best-M scheme. Moreover, in case that the Peak-M scheme is used for the selection of the subband in the first selection step, as mentioned in the following description, it is able to prevent a problem that overlapping is generated between adjacent subbands in the second selection step. According to another preferred embodiment of the present invention, proposed is a method of using Peak-M scheme as a scheme for selecting a subband in the first selection step, which is explained with reference to the accompanying drawings as follows. Yet, a CQI generating and transmitting method according to Peak-M scheme can be performed independent from the above-described CQI generating and transmitting method based on the adjacent band selection scheme.

Figure 4:
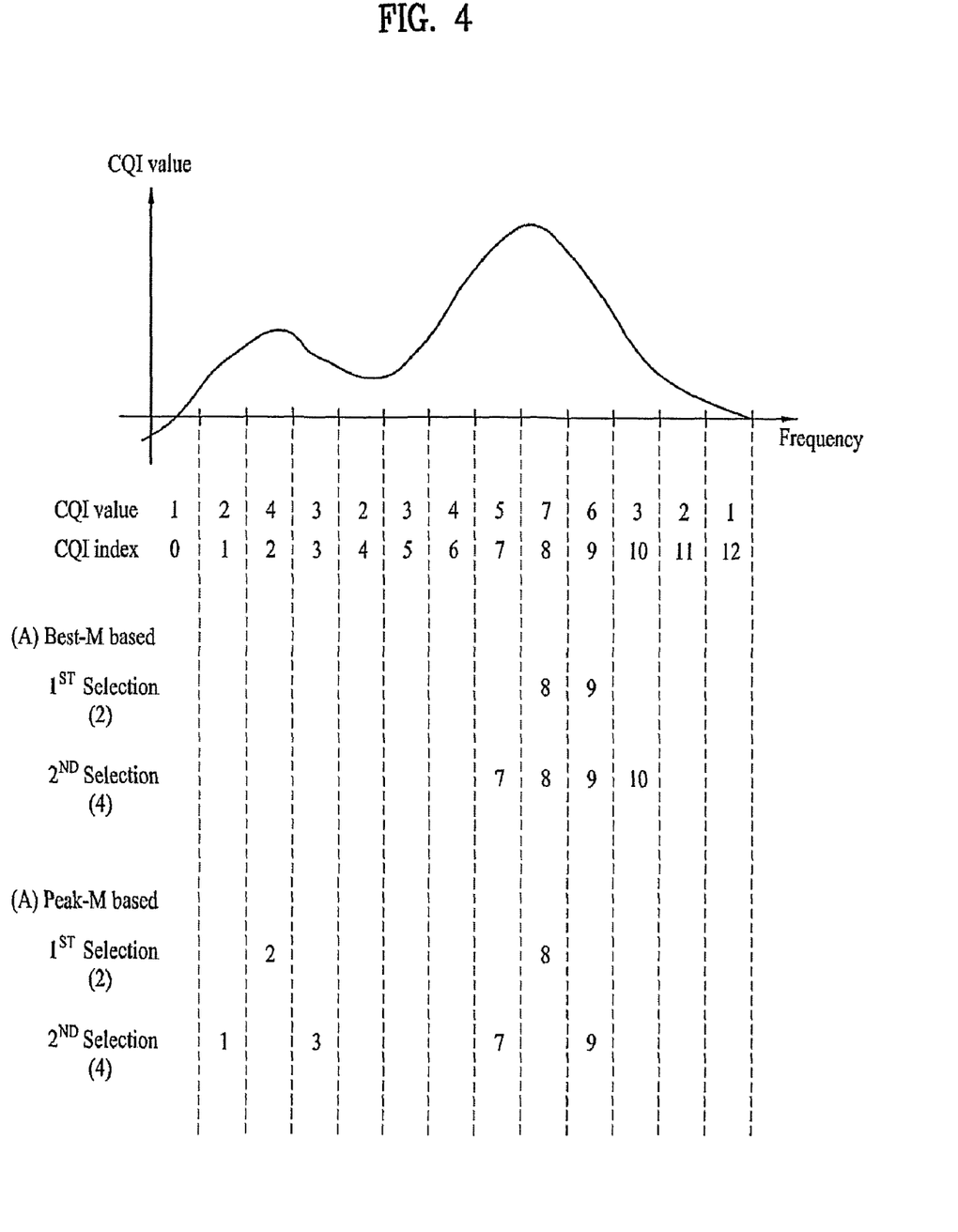
FIG. 4 is a diagram for a CQI generating and transmitting method based on Peak-M scheme according to another preferred embodiment of the present invention.

FIG. 4 is a diagram for a CQI generating and transmitting method based on Peak-M scheme according to another preferred embodiment of the present invention.

Referring to FIG. 4, like FIG. 2, in a graph shown on a top, a horizontal axis indicates a frequency axis and a vertical axis indicates a CQI value in each frequency domain. Moreover, in the top graph shown in FIG. 4, the horizontal axis is divided by a subband unit in which a plurality of subcarriers are grouped together. And, an index is allocated to each subband.

In the present embodiment, Peak-M scheme means the scheme of generating a corresponding CQI by selecting local maxima on a whole band and then transmitting the generated CQI. In particular, by selecting M peaks corresponding to local maxima, a CQI of the corresponding peak is transmitted. The Peak-M scheme differs from the Best-M in that the Peak-M scheme selects M peaks having channel statuses better than those of neighbor CQI subbands, while the Best-M scheme selects M CQI subbands having best channel qualities.

Namely, as shown in the top graph of FIG. 4, when a CQI profile appears along a whole frequency axis, if two subbands are selected by Best-2 scheme, subbands 8 and 9 will be selected as the two subbands indicating greatest CQI values. Thereafter, as mentioned in the foregoing description, if four subbands adjacent to the subbands selected in the first selection step are simply selected in the second selection step, subbands 7, 8, 9 and 10 can be selected as the subbands adjacent to the subbands 8 and 9. Meanwhile, since the subbands 8 and 9 are selected in the first selection step, the subbands 7 and 9 except the subbands selected in the first selection step can be selected in the second selection step only.

On the other hand, in the example of FIG. 4, in case of using the Peak-M scheme in the first selection step, subbands 2 and 8 indicating peaks as the local maximal along the whole frequency axis will be selected in the first selection step. In the same manner of the former example, if four subbands adjacent to the subbands selected in the first selection step are simply selected in the second selection step, subbands 1, 3, 7 and 9 can be selected as the subbands adjacent to the subbands 2 and 8, respectively.

According to one preferred embodiment of the present invention, in case of using the Peak-M scheme in selecting subbands in the first selection step, as can be observed from the example shown in FIG. 4, it is able to prevent subbands from being overlapped when adjacent bands are selected in the second selection step. In the example of FIG. 4, according to a preferred embodiment of the present invention, if the Peal-M scheme is used for the first selection step and if subbands are selected according to the adjacent band selection scheme in the second selection step, total six subbands 1, 2, 3, 7, 8 and 9 are selected. And, it is just necessary to feed back indexes of the subbands 2 and 8 among those subband indexes. Therefore, it is able to feed back a channel quality of more subbands by minimizing overhead.

In the above-described embodiment, the Peak-M scheme is explained in detail as follows.

First of all, a peak in the Peak-M scheme can be defined as an inflection point at which an increasing/decreasing direction of a CQI is inverted. Therefore, the Peak-M scheme can be performed by the following two steps. First of all, all peaks are selected from a whole band. Secondly, M peaks indicating best CQIs are selected from the selected entire peaks. Through the above-explained steps, the above-mentioned Peak-M scheme can be implemented.

Meanwhile, the above-described Peak-M scheme can be flexibly applicable as follows. Namely, the above-described Peak-M scheme is the scheme for transmitting total M peaks in a whole frequency band. Instead of selecting predetermined M peaks unconditionally, if the number of peaks is small due to a flat channel environment overall, it may be able to select peaks having the number smaller than the predetermined M only.

Thus, in case that peaks amounting to the number smaller than the predetermined M are selected, the rest of subbands can be selected by the above-mentioned adjacent band selection scheme. Namely, according to one preferred embodiment of the present invention, the number of the subbands selected in the first or second selection step is flexibly applicable according to a channel status.

According to one preferred embodiment of the present invention, in order to apply the above-described Peak-M scheme more efficiently, it is able to set peaks to be selected over or under a predetermined threshold only in selecting peaks. This is explained with reference to FIG. 5 as follows.

Figure 5:
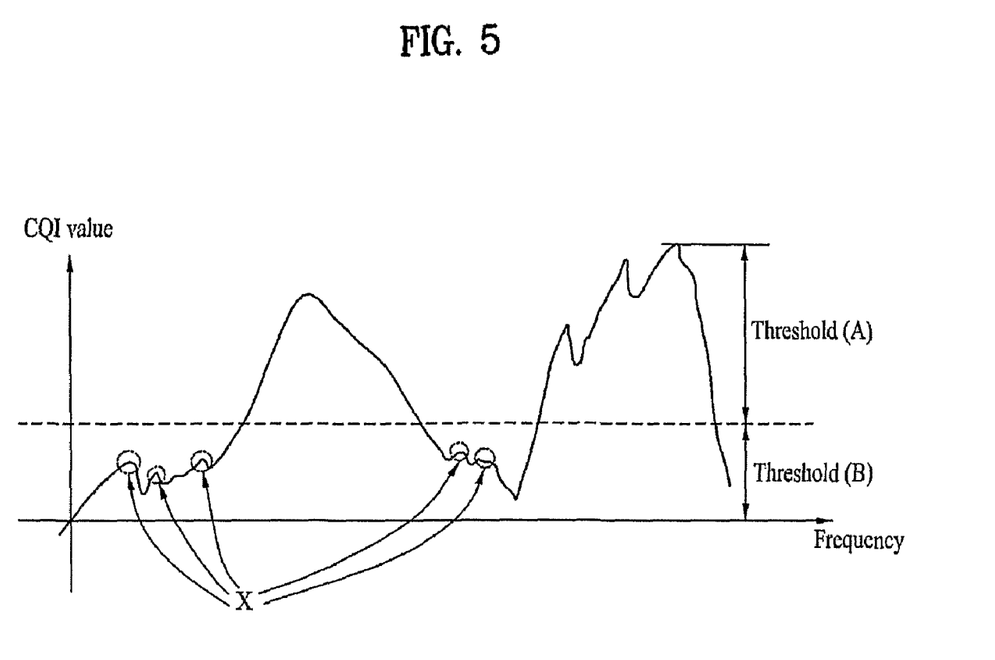
FIG. 5 is a diagram for a setting method of enabling a peak value satisfying a specific threshold reference to be selected only according to one preferred embodiment of the present invention.

FIG. 5 is a diagram for a setting method of enabling a peak value satisfying a specific threshold reference to be selected only according to one preferred embodiment of the present invention.

Referring to FIG. 5, as mentioned in the foregoing description, in selecting peaks according to the Peak-M scheme, although peaks are actually correct, if a CQI value of the peak is considerably lower than a CQI value around the peak, it many not be efficient to transmit the corresponding peak via CQI subband. For instance, if a CQI profile according to a whole frequency axis, as shown in FIG. 5, has more peaks X relatively small, it may not be efficient to report CQI values thereof.

Therefore, the present embodiment proposes to apply the threshold concept to the Peak-M scheme. In this case, a threshold can be set according to an absolute channel status or CQI value (e.g., a threshold (B) sown in FIG. 5) or can be set to a prescribed level range equal to or smaller than a best CQI value in a whole frequency band (e.g., a threshold (A) in FIG. 5). According to this embodiment, a selection for the peak is not considering the entire CQI in a whole frequency band but can be set to select a peak after selecting a partial frequency band indicating a CQI value greater than a predetermined threshold (or within a predetermined threshold range).

The above-described Peak-M scheme is applicable together with the adjacent band selection scheme in the former description of the embodiment or can be independently performed separate from it. In particular, the scheme can be used in a manner of reporting positions of M subbands selected by the Peak-M scheme and CQI values in the subbands only.

Moreover, the above-described adjacent band selection scheme can be used by being combined with the random scheme as the first selection step as well. In particular, both of the Peak-M scheme and the Best-M scheme are usable as the scheme for selecting subbands in the first selecting step. Besides, in case that the Best-M scheme is used as the scheme for selecting the subbands in the first selection step together with the adjacent band selection scheme, unlike the case of (A) shown in FIG. 4, it can be used by being set to prevent the overlapped subbands from being selected in selecting adjacent subbands by the adjacent band selection scheme thereafter. In particular, in case that the CQI profile at the top of FIG. 4 is represented, if subbands 8 and 9 are selected by the Best-M scheme in the first selection step, when four subbands adjacent to those subbands in the second selection step, it is able to set the subbands 6, 7, 10 and 11 to be selected in order to prevent the overlapped subbands.

According to a further embodiment of the present invention, it is able to apply an adjacent band selection scheme in the course of selecting subbands according to the first selection step. For the detailed description, let's consider a case that the subband selection scheme in the first selection step is the Best-M scheme by taking the same example of the above description.

First of all, a band having a highest CQI is preferentially selected according to the Best-M scheme (e.g., subband 8 in FIG. 4). In this case, CQI subbands of both adjacent bands of the selected band are selected as well (e.g., subbands 7 and 9 in FIG. 4). Secondly, when a second highest CQI subband is selected, a second highest CQI subband is selected from the frequency band except the formerly selected highest CQI subband and the CQI subbands adjacent to both sides of the formerly selected highest CQI subband (e.g., subband 2 in FIG. 4). Thirdly, two, subbands adjacent to the second highest CQU subband are selected. In this case, the two adjacent subbands are selected to avoid being overlapped with the already selected subband (e.g., subbands 1 and 3 in FIG. 4). This operation can be repeatedly performed until total M CQI subbands and CQI subbands adjacent to both sides of each of the M CQI subbands are selected.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

For instance, although the above-described preferred embodiments of the present invention are mainly focused on the example of the 3GPP LTE in generating and transmitting CQI, a CQI generating method and a user equipment for the same according to the present invention are applicable to such a random system, for which feedback for a downlink channel quality is required, as an IEEE 802 series communication method and the like as well as to the 3GPP LTE.

In the above description, 'base station' means a fixed station communicating with a user equipment in general and can be called such a terminology as a node-B, a base transceiver system (BTS), an access point and the like. In the above description, 'user equipment' is a random subject, which is fixed or can have mobility, and can be named such a terminology as a terminal, a user terminal (UT), a subscriber station (SS), a wireless device and the like.

Therefore, the present invention intends not to limit the examples of the embodiments disclosed herein but to give a broadest range matching the principles and new features disclosed herein.

INDUSTRIAL APPLICABILITY

Accordingly, a method of generating and transmitting a channel quality indicator based on an adjacent band selection scheme according to various embodiments of the present invention is able to transmit a maximum number of channel information as well as minimize overhead in generating and transmitting a channel quality indicator. Therefore, the present invention is applicable to a random wireless communication system requesting feedback for a downlink channel quality as well as the 3GPP LTE system explained as the detailed example in the foregoing description.

What is claimed is:

1. A method for a user equipment to generate a channel quality indicator (CQI), the method comprising:
   a first selection step of selecting at least one subband by considering a channel quality of each of entire subbands formed by grouping a predetermined number of subcarriers;
   a second selection step of additionally selecting subbands adjacent to the at least one subband selected in said first selection step; and
   a step of generating the channel quality indicator corresponding to the subbands selected in said first selection step and said second selection step.

2. The method of claim 1, wherein the number of the subbands additionally selected in said second selection step is determined to be proportional to at least one of a whole system bandwidth and a frequency bandwidth allocated to the user equipment.

3. The method of claim 2, wherein the subbands additionally selected in said second selection step are sequentially selected in order of being adjacent to both sides of two subbands most adjacent to both sides of the subband selected in said first selection step.

4. The method of claim 1, wherein the subbands additionally selected in said second selection step are selected from the subbands not overlapped with the subband selected in said first selection step.

5. The method of claim 1, wherein in the channel quality indicator generating step, the channel quality indicator corresponding to the subbands additionally selected in said second selection step is generated as a difference value from the channel quality indicator corresponding to the subbands selected in said first selection step.

6. The method of claim 1, wherein said first selection step comprises the step of selecting at least one from the subbands corresponding to a point indicating a peak in a whole channel quality profile.

7. The method of claim 6, wherein the point indicating the peak indicates a point at which a channel quality is changed into a decrease from an increase in the whole channel profile.

8. The method of claim 6, wherein the peak is the one having the channel quality equal to or greater than a prescribed threshold among entire peaks in the whole channel quality profile.

9. A method for a user equipment to generate a channel quality indicator (CQI), the method comprising:
   a first selection step of selecting at least one subband by considering a channel quality of each of entire subbands formed by grouping a predetermined number of subcarriers;
   a second selection step of additionally selecting subbands adjacent to the at least one subband selected in said first selection step;
   a third selection step of additionally selecting a single subband by considering channel qualities of subbands except the subbands selected in the preceding selection steps including said first and second selection steps;
   a fourth selection step of additionally selecting subbands adjacent to the subband selected in said third step from the subbands except the subbands selected in the preceding selection steps including said first and second selection steps; and
   a step of generating the channel quality indicator corresponding to the subbands selected through said first to fourth selection steps.

10. The method of claim 9, wherein said third and fourth selection steps are repeatedly performed.

11. A method for a user equipment to transmit a channel quality indicator (CQI), the method comprising:
    a first selection step of selecting at least one first subband by considering a channel quality of each of entire subbands formed by grouping a predetermined number of subcarriers;
    a second selection step of additionally selecting second subbands adjacent to the at least one first subband;
    a step of generating the channel quality indicator corresponding to the first and second subbands; and
    a step of transmitting the generated channel quality indicator and position information of the subband for generating the channel quality indicator.

12. The method of claim 11, wherein in said transmitting step, position information of the second subbands is not transmitted.

13. The method of claim 11, wherein in said transmitting step, transmission of the channel quality indicators corresponding to the second subbands is performed in a manner of transmitting channel quality information corresponding to only one of the two second subbands symmetric centering on the first subband.

14. The method of claim 11, wherein in said transmitting step, transmission of the channel quality indicators corresponding to the second subbands is performed in a manner of transmitting an average of channel quality informations corresponding to the two second subbands symmetric centering on the first subband.

* * * * *